United States Patent Office 2,879,185
Patented Mar. 24, 1959

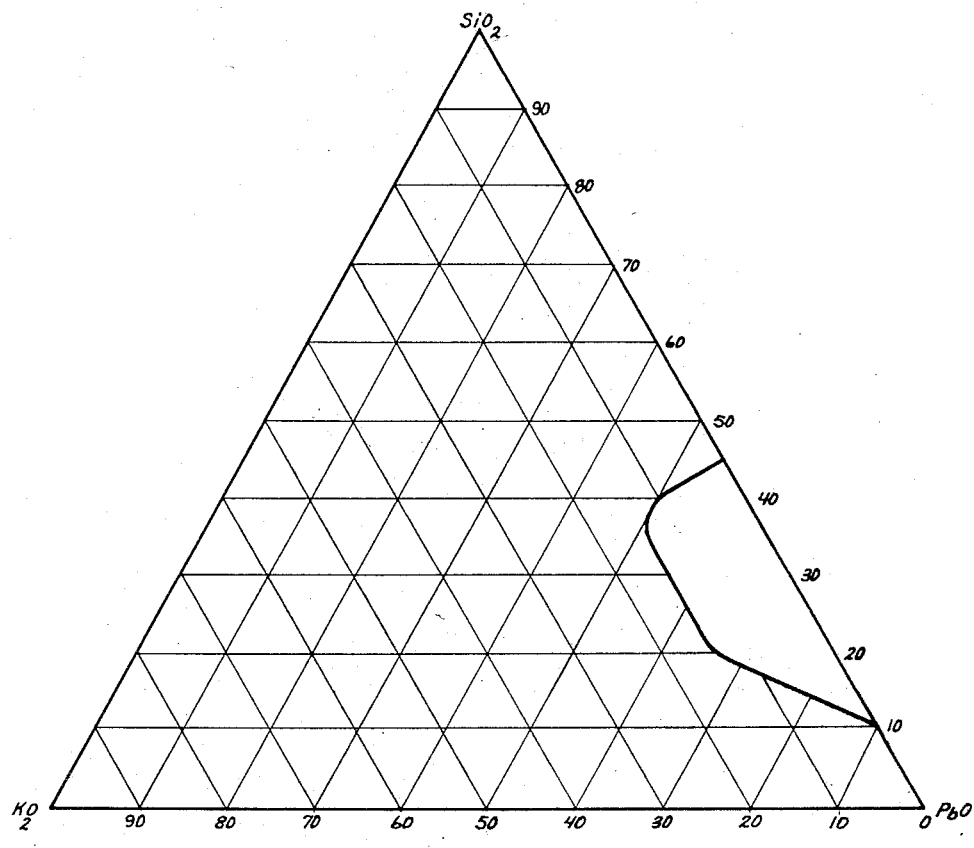

2,879,185

CERAMIC COATING FOR MAGNET WIRE

Burnham W. King and George D. Kelly, Columbus, Ohio, assignors, by mesne assignments, to General Electric Company, Fort Wayne, Ind., a corporation of New York Application May 27, 1957, Serial No. 661,863

16 Claims. (Cl. 117—223)

This invention relates to ceramic coatings for use as insulation in electrical equipment, and more particularly to a ceramic suitable for providing an insulating coating for magnet wire used in electrical apparatus.

Where an electromagnetic effect is to be induced in electrical apparatus, it is generally effected by passing current through a number of turns of conductive wire; these turns are generally positioned about a core of magnetic material so as to induce flux therein. The conductive wire, or magnet wire as it is called, must be covered with adequate insulation both to prevent shorting between adjacent turns of the magnet wire and to prevent electrical contact between the magnet wire and the magnetic core on which it is placed, or any other conductive part adjacent to the wire. The effectiveness of the electrical apparatus is frequently in proportion to the number of turns of magnet wire provided; together with the fact that space is often at a premium in electrical equipment, this means that the insulation of the magnet wire must be accomplished using as little space as possible. Nonetheless, the high voltages which are frequently encountered across such wires require that the insulation have a high order of dielectric strength.

Another factor which must be considered in connection with the insulating of magnet wire is the amount of "working" which the wire necessarily undergoes from the time the insulation is provided until the wire has been formed into a coil in an electrical assembly. The wire is frequently wound around corners at a relatively tight angle, causing a considerable force on the insulation which tends both to make it crack and to make it pull away from the wire. For magnet wire to be satisfactory in commerical use, both of these tendencies must be overcome to a substantial extent.

Another point of difficulty is that it is becoming more and more common to wind wire into coils by automated means. While such automatic equipment has a far greater output than would be possible by manual methods, the magnet wire necessarily undergoes rougher treatment than is true where it is subjected only to human handling. Consequently, the coating for the wire has to be tough, with major resistance to abrasion.

The foregoing relates only to the hardships which the wire and its insulation must undergo during the manufacturing process. After it is assembled into the electrical apparatus, the apparatus may be subjected to extremes of temperatures, both high and low, which the insulation of the magnet wire must withstand without any detrimental effect.

Thus, to summarize, the insulation for magnet wire must ideally (1) have high dielectric strength, (2) be exceedingly flexible and tough, (3) have the ability to adhere very strongly to the magnet wire despite considerable bending of the wire, (4) be hard and resistant to abrasion, and (5) have the ability to withstand extremes of temperature without adverse effect.

While there are several materials presently available which will provide most of the qualities enumerated above, the requirement for flexibility and good adherence to the magnet wire has resulted in these materials almost invariably being of an organic nature. Where such is true, i.e., the chemical formulation of the insulation is organic, the maximum safe operating temperatures for the insulation and the dielectric qualities, while both acceptable for a great many applications, are markedly inferior to the results which can be obtained by the use of inorganic materials. However, substantial use of inorganic materials for magnet wire insulation has been precluded by the fact that such materials are normally of a brittle nature; while this does not impair their usefulness on parts which do not undergo considerable deformation, it has precluded their use on magnet wire, where major deformation of the wire is inherent in its use.

Consequently, to the best of the applicants' knowledge, no inorganic coatings, particularly those of a ceramic nature where the coatings are formed by heat, have been found usable as the insulating covering for magnet wire. However, with the high operating temperatures frequently required of electrical equipment at the present time, and with the number of such applications continually on the increase, it becomes necessary to obtain the insulating and heat resistance qualities of ceramic materials together with the flexibility required for magnet wire applications.

Accordingly, it is a prime object of the present invention to provide an improved ceramic frit (a frit being small particles of glass produced by fusing inorganic ingredients and then quenching the resulting molten glass) which may be fused to form a coating on magnet wire to achieve the qualities enumerated above.

More particularly, it is an object to provide a ceramic coating having high heat resistance and high dielectric strength together with great flexibility and excellent adherence to the magnet wire.

A further object of the invention is to provide a ceramic-coated copper magnet wire which is highly flexible without adverse effect to the insulating coating and which is suitable for use in apparatus where high dielectric strength of the coating and high resistance to heat are both of importance.

A further object of the invention is to provide a magnet wire having an insulating coating which has the previously mentioned heat resistance and insulating features together with a high degree of adherence to the wire.

A further object is to provide a process for applying a ceramic coating to copper magnet wire to obtain the advantages discussed above.

In one aspect thereof, this invention provides an improved ceramic frit suitable for use in a ceramic coating to be applied to copper magnet wire. The term "copper" is intended to include all alloys containing a substantial proportion of copper, as well as relatively pure copper. The frit comprises, per 100 parts by weight, the following components: first, it includes a member selected from the group consisting of: (a) 45 to 85 parts by weight of PbO, (b) a mixture of PbO and a member selected from the class consisting of CaO and BaO and mixtures thereof in which less than 20 parts by weight of the PbO in (a) is replaced by a molar equivalent amount of said material, (c) a mixture of PbO and ZnO in which up to 20 parts by weight of the PbO in (a) is replaced by a molar equivalent amount of ZnO, (d) a mixture of PbO and SrO in which up to 15 parts by weight of the PbO in (a) is replaced by a molar equivalent of SrO and (e) a mixture of PbO and $B_2O_3$ in which less than 15 parts by weight of the PbO in (a) is replaced by the same weight of $B_2O_3$, and mixtures of said members.

The second component of the frit consists either of 8 to 40 parts by weight of $SiO_2$ or a mixture of $SiO_2$ and $B_2O_3$ in which less than 15 parts by weight of $SiO_2$ is replaced by the same weight of $B_2O_3$.

The third component of the frit is NiO, between a minimum of 2 parts by weight and a maximum of 11 parts by weight. For any particular composition, the minimum NiO content per 100 parts by weight of the frit is the greater value between 2 parts by weight and one-third of the amount of NiO required for the frit to be saturated with NiO; the maximum nickel oxide content ranges between 110 and 150 percent of the amount required for saturation of the frit with nickel oxide, but with a maximum limit of 11 parts by weight per 100 parts by weight of frit.

A fourth possible major component is selected from the group which consists of $K_2O$, $Na_2O$ and $Li_2O$ and mixtures thereof. Either $K_2O$ or $Na_2O$ may be present in amounts from zero to 13 parts by weight. The $Li_2O$ may be present in amounts from zero to 4 parts by weight, replacing up to the entire amount of $K_2O$ or $Na_2O$ on a molar equivalent basis. The mixtures may also be present up to the equivalent of 13 parts by weight of $K_2O$ or $Na_2O$, with $K_2O$ and $Na_2O$ being substituted for the other on a direct weight basis. Where $Li_2O$ is included in the mixture, the sum of the components should not exceed 0.2 moles per 100 parts by weight of frit.

As used herein, the term "up to," as used in connection with the range of a material, excludes zero and includes the positive amount set forth, except where otherwise stated. The term "less than," when used in connection with the range of a material, excludes a zero quantity of that material and does not include the positive limit set forth, except where otherwise stated.

The frit having the composition described above is prepared into a slip—liquid suspension of finely divided frit—as will be more fully set forth below. The slip is then applied to copper magnet wire by appropriate means, such as dip coating. When the frit is thus prepared, applied to copper magnet wire, and fused, it incorporates to a major extent the desirable features discussed hereabove.

The features of the invention which are believed to be novel are set forth with particularity in the appended claims. The invention itself, however, together with further objects and advantages thereof, may best be understood by reference to the following description taken in connection with the accompanying drawing.

In the drawing, the single figure is a ternary diagram illustrating the relative proportions of three of the four constituents of the improved ceramic frit of this invention.

Referring now to the figure of the drawing, it can be seen that three of the four ingredients of the improved frit constitute a combination which is relatively standard in the ceramic art with, however, some slight modification in the permissible limits of the proportioning of the constituents. Thus, the $SiO_2$ varies between limits of 10 and 45 percent by weight of the three constituents, the $K_2O$ varies from zero to 14 percent, and the PbO from 50 to 90 percent. As will be more fully discussed below, each of these three constituents may be replaced to some extent by other oxides. In addition to these three oxides (there are, of course, only two oxides where the $K_2O$ is zero), an amount of NiO, between 2 and 12 parts by weight per 100 parts by weight of the other three constituents, is added. The four oxides are heated together into a molten state so as to fuse together to form the frit. While the limitations on the amount of nickel oxide will be discussed more in detail herebelow, the best results are obtained when the amount of nickel oxide is as close as possible to that which is needed to saturate the frit with nickel oxide. This amount has been found to vary depending upon the proportioning of the other constituents of the frit.

After the frit has been formed in the usual manner by heating to a molten condition and quenching in order to shatter the material, it is prepared into a slip for application to copper magnet wire. This is effected by adding to the frit a suitable liquid carrier and suitable electrolyte material (added to help make the frit remain in suspension in the liquid) and then milling. Suitable liquid carriers may be selected from any material which may readily be driven off and which will not have an unwanted reaction with the frit; examples of such carriers are methyl and ethyl alcohol; water; pine oil; or suitable mixtures, where such carriers are miscible. Suitable electrolytes are generally selected from sodium silicofluoride, sodium silicate, potassium silicofluoride, or sodium phosphate, but, of course, other suitable compounds may be selected. After the milling, the amount of liquid may be adjusted in order to provide the proper specific gravity of the slip for optimum coating effect. The copper wire to be coated with the slip is cleaned by any standard means such as, for instance, bright annealing, and the slip is then applied to the wire, as by dip coating for instance. The thickness of the film each time the wire is dipped is adjustable by either modifying the specific gravity of the slip or the speed of the wire passing through it. The dipped wire is passed through a furnace which drives off the liquid, fuses the ceramic, and causes tight adherence of the ceramic coating to the wire.

The presence of the nickel oxide in the frit is of the utmost importance in the preparation of a ceramic coating for magnet wire. With this material, as will be seen by the specific examples which follow, the advantages ordinarily obtained from ceramic coatings were enhanced by a high degree of flexibility of the coating and excellent adherence to the copper wire. Without the nickel oxide present in the frit in the quantities stated, the insulating and heat resistant qualities of the ceramic coating became useless because of its tendency to crack and break away from the wire when subjected to the bending that magnet wire must normally undergo.

The exact chemistry involved in the success achieved with the nickel oxide in the frit is not entirely understood. In fact, the experimentation with nickel oxide was undertaken only after almost all metal oxides which might normally be considered as potential adherence promoters had been tried and abandoned.

The advantages to be obtained from the inclusion of the nickel oxide with the other constituents of the frit to form a ceramic coating for magnet wire will be best understood from the examples which follow. It is to be understood that the examples are given only for purposes of illustration and are not to be construed as limitations on the invention. All parts and percentages are by weight except where otherwise specifically noted.

*Example 1*

The following ingredients were provided in the weight proportions set forth below:

| | Percent by weight |
|---|---|
| $SiO_2$ | 25.8 |
| PbO | 62.1 |
| $K_2O$ | 7.3 |
| NiO | 4.1 |
| $Al_2O_3$ | 0.7 |

These constituents were blended together into a frit in the usual manner by heating to 2400 degrees Fahrenheit for 60 minutes and then quenching the molten glass in water to shatter it. The resulting frit was then made into a slip having the following composition:

| | Parts by weight |
|---|---|
| Frit | 100 |
| Monobasic sodium phosphate | 1 |
| Sodium silicofluoride | 0.4 |
| Ethyl alcohol | 20 |
| Water | 20 |

The monobasic sodium phosphate and the sodium silicofluoride were added to act as electrolytes to help maintain the frit in suspension in the combination of alcohol and water. This slip was prepared by milling in a ball mill for six hours and checking on a 325 mesh screen. After six hours there was no residue on the 325 mesh screen from a 100 gram sample of the slip, and the specific gravity of the slip was 2.15. The slip, thus prepared, was applied to cleaned copper wire having a diameter of 0.0113 inch by dip coating in one pass, and the coated wire was subjected to a temperature of 1575 degrees Fahrenheit for about 8 seconds in a nitrogen atmosphere.

Samples of coated wire were then evaluated for adherence, flexibility, and insulation by the following tests:

*Test 1.*—Conductive foil was wrapped around a length of coated wire, and a voltage was then applied across the foil and the wire. The voltage was increased until breakdown of the insulation was observed.

*Test 2.*—Lengths of coated wire were looped over mandrels of diameters varying from one inch down to 0.04 inch. In each case one end of the wire was held rigidly, and a one-pound weight was suspended from the other end. The voltage across the length of wire was then increased until breakdown of the insulation was observed.

When the coated wire was tested using the procedures described above, the results were as follows:

*Test 1.*—An average of 67 volts was required to break down the insulation film (about 0.5 mil).

*Test 2.*—The copper wire remained coated and insulated in all cases down to the test on a mandrel of .065 inch diameter. The average breakdown voltage varied from 188 (on the one-inch mandrel) to 118 (on the 0.065 inch mandrel). Only when a mandrel of 0.040 inch diameter was used did the coating crack and expose the copper so to cause electrical failure.

The same ceramic coating was also applied to copper wires having diameters of .0159 inch, .0201 inch, .032 inch, .0403 inch, and .0641 inch. These coated wires were subjected to the same tests as the .0113 inch wire, with the exceptions that two-pound and five-pound weights were used for the .0403 inch and .0641 inch wires respectively, and that some different mandrel sizes were used. Briefly, the results of those tests were as follows:

.0159 inch wire:
   Test 1: 199 volts average breakdown.
   Test 2: Breakdown voltage varied from 228 with a .375 inch mandrel to 206 with a .120 inch mandrel. There was substantial failure when a .085 inch mandrel was used.
.0201 inch wire:
   Test 1: 231 volts average breakdown.
   Test 2: Breakdown voltage varied very little, from 180 with a one-inch mandrel to 194 with a .125 inch mandrel. The coating failed when a .062 inch mandrel was used.
.032 inch wire:
   Test 1: 83 volts average breakdown.
   Test 2: Breakdown voltage varied relatively little (120–180) as the mandrel size was decreased to .375 inch. At .300 inch, breakdown occurred at 75 volts, at .250 inch it occurred at 30 volts, and at .125 inch the coating failed.
.0403 inch wire:
   Test 1: 147 volts average breakdown.
   Test 2: Breakdown voltage decreased a little (from about 170 to 109) when the mandrel size was decreased to .5 inch. Failure occurred at .25 inch.
.0641 inch wire:
   Test 1: 199 volts average breakdown.
   Test 2: No failure at all occurred down to and including the one-inch mandrel test.

The foregoing results show that the ceramic coating may be used over a wide variety of wire sizes (not necessarily restricted to the range given above), and that good insulation is provided under all bending conditions to which such wire would normally be subjected in use, failure occurring only when the wire is subjected to relatively extreme tests which do not represent conditions of actual use.

*Example 2*

A second example of a frit, and its application as a ceramic coating for copper magnet wire, contained the following constituents:

| Oxide: | Percent by weight |
|---|---|
| $SiO_2$ | 26.5 |
| $PbO$ | 63.7 |
| $Na_2O$ | 5.0 |
| $NiO$ | 4.2 |
| $Al_2O_3$ | 0.6 |

These were formed into a frit, as in Example 1, and the frit was then prepared as a slip by ball milling for fifteen hours the following constituents by weight:

| | Parts by weight |
|---|---|
| Frit | 100 |
| Monobasic sodium phosphate | 1 |
| Sodium silicofluoride | 0.4 |
| Ethyl alcohol | 20 |
| Water | 20 |

The slip was then applied to cleaned copper wire having a diameter of 0.032 inch by dip coating in one pass and then subjected to a temperature of 1500 degrees Fahrenheit for about 30 seconds in a nitrogen atmosphere. The thickness of the coating was 0.5 mil.

The coated wire was evaluated for adherence and flexibility of the coating by the following tests:

*Test 3.*—A 10-inch length of the coated wire was wrapped by hand around a mandrel having a diameter of one inch so as to form a coil of wire having a concave diameter of one inch and a pitch of about ¼ inch. The coil was then slid off the mandrel and the coating was inspected for adherence to the wire at a magnification of 12×.

*Test 4.*—Same as Test 1 except that a mandrel having a diameter of ⅜ inch was employed.

*Test 5.*—Two 6-inch lengths of coated wire were held parallel and adjacent. While one pair of ends was held firmly, the other pair of ends was given twelve 360-degree twists so as to form a straight specimen composed of two wires twisted around each other. This so-called "twisted pair" was then inspected for adherence of the coating to the wires at a magnification of 12×.

*Test 6.*—The straight "twisted pair" specimen from Test 3 was wrapped by hand around a mandrel having a diameter of one inch to form a coil having a diameter of one inch and a pitch of about ¼ inch. The ends of the coil were then grasped by hand and pulled in opposite directions parallel to the longitudinal axis of the coil so as to return the twisted pair of wires more or less to its original straight form.

When this coated wire was tested using the procedures described above, the results were as follows:

*Test 3.*—On the concave and convex surfaces of the bends, the outer portion of the coating cracked intermittently and disassociated itself from the wire. At these points, however, a substrate layer of the coating remained intact and attached tightly to the wire.

Bare copper wire was not exposed at any place on the test specimen.

*Test 4.*—The outer portion of the coating cracked and disassociated itself from the wire over most of the concave and convex surfaces of the bends. Again, however, a substrate layer of the coating remained firmly attached to the wire and bare copper was not exposed at any place on the test specimen.

*Test 5.*—The outer portion of the coating cracked and disassociated itself from the wire over most of the areas which had been subject to severe stresses. Again, however, a substrate layer of the coating remained intact and firmly attached to the wire. Again, no bare copper was exposed at any place on the test specimen.

*Test 6.*—The results were essentially the same as those described for Test 5 above.

Example 3

A third example contained the following constituents:

| Oxide: | Percent by weight |
|---|---|
| $SiO_2$ | 27.2 |
| PbO | 65.4 |
| $Li_2O$ | 2.5 |
| NiO | 4.3 |
| $Al_2O_3$ | 0.6 |

These oxides were prepared as a frit, as in Example 1, and the frit was then prepared into a slip as in Example 2. The slip was then applied to cleaned copper wire having a diameter of 0.032 inch by dip coating in one pass to build up a film of 0.7 mil. The coated wire was subjected to a temperature of 1500 degrees Fahrenheit for about 30 seconds in a nitrogen atmosphere.

When subjected to the same tests for flexibility and adherence as the wire of Example 2, the results were substantially the same.

Example 4

A frit was prepared in the same manner as in Example 1 with the following ingredients being provided:

| Oxide: | Percent by weight |
|---|---|
| $SiO_2$ | 26.2 |
| $K_2O$ | 7.4 |
| PbO | 58.1 |
| BaO | 3.5 |
| NiO | 4.2 |
| $Al_2O_3$ | 0.6 |

This frit was then prepared into a slip as in Example 2. The slip was then applied to cleaned copper wire having a diameter of 0.032 inch by dip coating, and a film thickness of 0.5 mil was provided in one pass, with the wire being subjected to a temperature of 1500 degrees Fahrenheit for about 30 seconds in a nitrogen atmosphere. When wire coated in accordance with this example was tested for flexibility and adherence as set forth in Example 2 the results were substantially the same.

Example 5

A frit having the following composition was prepared in accordance with the procedure described in Example 1:

| Oxide: | Percent by weight |
|---|---|
| $SiO_2$ | 29.0 |
| $K_2O$ | 8.3 |
| PbO | 53.0 |
| CaO | 4.3 |
| NiO | 4.6 |
| $Al_2O_3$ | 0.8 |

This frit was then prepared into a slip as described in Example 2. The slip was then applied to cleaned copper wire having a diameter of 0.032 inch by dip coating, and a film of 0.6 mil was provided in one pass with the wire being subjected to a temperature of 1525 degrees Fahrenheit for about 30 seconds in a nitrogen atmosphere. When subjected to the tests described in Example 2, the results were substantially the same.

Example 6

A frit having the following composition was prepared in accordance with the procedure described in Example 1:

| Oxide: | Percent by weight |
|---|---|
| $SiO_2$ | 27.6 |
| $K_2O$ | 7.8 |
| PbO | 55.7 |
| ZnO | 3.9 |
| NiO | 4.4 |
| $Al_2O_3$ | 0.6 |

This frit was then prepared into a slip as in Example 2. The slip was then applied to cleaned copper wire having a diameter of 0.032 inch by dip coating to provide a film thickness of 0.5 mil in one pass, with the wire being subjected to a temperature of 1530 degrees Fahrenheit for about 30 seconds in a nitrogen atmosphere. When tested in accordance with the procedure set forth in Example 2, the results were substantially the same.

Example 7

A frit was prepared in accordance with the procedure set forth in Example 1 and having the following composition:

| Oxide: | Percent by weight |
|---|---|
| $SiO_2$ | 27.2 |
| $K_2O$ | 7.7 |
| PbO | 55.0 |
| SrO | 4.9 |
| NiO | 4.4 |
| $Al_2O_3$ | 0.8 |

This frit was then prepared into a slip in accordance with the procedure set forth in Example 2. The slip was then applied to cleaned copper wire having a diameter of 0.032 inch by dip coating, with a film of 0.6 mil being provided in one pass, the wire being subjected to a temperature of 1500 degrees Fahrenheit for about 30 seconds in a nitrogen atmosphere. When subjected to the tests described in Example 2, the results were substantially the same.

Example 8

A frit having the following composition was prepared in accordance with the procedure described in Example 1:

| Oxide: | Percent by weight |
|---|---|
| $SiO_2$ | 16.0 |
| $K_2O$ | 7.3 |
| PbO | 61.9 |
| $B_2O_3$ | 10.0 |
| NiO | 4.1 |
| $Al_2O_3$ | 0.7 |

This frit was then prepared into a slip in accordance with the procedure of Example 2. The slip was then applied to cleaned copper magnet wire having a diameter of 0.032 inch by dip coating so as to provide a film of 0.6 mil in one pass, the wire being subjected to a temperature of 1450 degrees Fahrenheit for about 30 seconds in a nitrogen atmosphere. The wire was then tested in accordance with the procedure described in Example 2 with substantially the same results.

Example 9

A frit having the following composition was prepared in accordance with the procedure set forth in Example 1:

| Oxide: | Percent by weight |
|---|---|
| $SiO_2$ | 19.0 |
| PbO | 76.0 |
| NiO | 4.2 |
| $Al_2O_3$ | 0.8 |

This frit was then prepared into a slip in accordance with the procedure of Example 2. The slip was then applied to cleaned copper wire of 0.032 inch diameter by dip coating to provide a film of 0.5 mil in one pass, the wire being subjected to a temperature of 1500 degrees Fahrenheit for about 30 seconds in a nitrogen atmosphere. When subjected to tests in accordance with those described in Example 2 the results were substantially the same.

*Example 10*

A frit having the following composition was prepared in accordance with the procedure set forth in Example 1:

| Oxide: | Percent by weight |
|---|---|
| $SiO_2$ | 33.2 |
| $K_2O$ | 7.2 |
| PbO | 49.2 |
| NiO | 9.7 |
| $Al_2O_3$ | 0.7 |

This frit was prepared into a slip in accordance with the procedure set forth in Example 2. The slip was then applied to cleaned copper wire having a diameter of 0.032 inch by dip coating to provide a film of 0.5 mil in one pass, the wire being subjected to a temperature of 1500 degrees Fahrenheit for about 30 seconds in a nitrogen atmosphere. Tests similar to those of Example 2 provided substantially the same results.

*Example 11*

A frit having the following composition was prepared in accordance with the procedure set forth in Example 1:

| Oxide: | Percent by weight |
|---|---|
| $SiO_2$ | 26.4 |
| $K_2O$ | 7.5 |
| PbO | 63.4 |
| NiO | 2.1 |
| $Al_2O_3$ | 0.6 |

This frit was prepared into a slip in accordance with the procedure set forth in Example 2. The slip was then applied to cleaned copper wire having a diameter of 0.032 inch by dip coating to provide a film of 0.5 mil in one pass, the wire being subjected to a temperature of 1475 degrees Fahrenheit for about 30 seconds in a nitrogen atmosphere. Tests similar to those of Example 2 provided substantially the same results.

*Example 12*

A frit having the following composition was prepared in accordance with the procedure set forth in Example 1:

| Oxide: | Percent by weight |
|---|---|
| $SiO_2$ | 26.0 |
| $K_2O$ | 7.4 |
| PbO | 62.5 |
| NiO | 4.1 |

This frit was prepared into a slip in accordance with the procedure set forth in Example 2. The slip was then applied to cleaned copper wire having a diameter of 0.032 inch by dip coating to provide a film of 0.6 mil in one pass, the wire being subjected to a temperature of 1480 degrees Fahrenheit for about 30 seconds in a nitrogen atmosphere. Tests similar to those of Example 2 provided substantially the same results.

*Example 13*

To illustrate the effectiveness of the applicants' invention, and in particular the necessity of including nickel oxide in the material, a frit having the following ingredients was prepared in accordance with the procedure set forth in Example 1:

| Oxide: | Percent by weight |
|---|---|
| $SiO_2$ | 26.9 |
| $K_2O$ | 7.6 |
| PbO | 64.8 |
| $Al_2O_3$ | 0.7 |

This frit was then prepared into a slip in accordance with the procedure set forth in Example 2. The slip was then applied to cleaned copper wire having a diameter of 0.032 inch by dip coating until a film of 0.5 mil was obtained in one pass, the wire being subjected to a temperature of 1480 degrees Fahrenheit for about 30 seconds in a nitrogen atmosphere. When this wire was tested in accordance with the procedure described in Example 2, the following results were obtained:

*Test 3.*—On the convex surface of the bends, the coating cracked and disassociated itself from the wire exposing bare copper intermittently.

*Test 4.*—On both the concave and convex surfaces of the bends, the coating cracked and disassociated itself from the wire exposing bare copper wire over most of both surfaces.

*Test 5.*—Bare copper wire exposed at all areas which were subjected to severe stresses.

*Test 6.*—The results were essentially the same as those described for Test 5 above.

These results made the wire entirely inappropriate for magnet wire purposes.

*Example 14*

To further illustrate the effectiveness of the applicants' invention, and in particular the necessity of including nickel oxide in the material, a frit having the following ingredients was prepared in accordance with the procedure set forth in Example 1:

| Oxide: | Percent by weight |
|---|---|
| $SiO_2$ | 25.9 |
| $K_2O$ | 7.3 |
| PbO | 62.1 |
| CoO | 4.1 |
| $Al_2O_3$ | 0.6 |

This frit was then prepared into a slip in accordance with the procedure set forth in Example 2. The slip was then applied to cleaned copper wire having a diameter of 0.032 inch by dip coating until a film of 0.8 mil was obtained in one pass, the wire being subject to a temperature of 1475 degrees Fahrenheit for about 30 seconds in a nitrogen atmosphere. When this wire was tested in accordance with the procedure described in Example 2, the results were as follows:

*Test 3.*—On the convex surface of the bends, the coating cracked and disassociated itself from the wire exposing an almost completely bare copper wire. On the concave surface of the bends, bare copper wire was exposed in intermittent areas.

*Test 4.*—Bare copper wire was exposed almost completely on concave and convex surfaces of bends over the entire length of the wire.

*Test 5.*—The results were essentially the same as those described for Test 4 above.

*Test 6.*—Both wires were practically bare over their entire surfaces.

These results made the wire entirely inappropriate for magnet wire purposes.

*Example 15*

For a third illustration of the effectiveness of the applicants' invention, and in particular the necessity of including nickel oxide in the material, a frit having the following ingredients was prepared in accordance with the procedure set forth in Example 1:

| Oxide: | Percent by weight |
|---|---|
| $SiO_2$ | 25.9 |
| $K_2O$ | 7.3 |
| PbO | 62.1 |
| $MnO_2$ | 4.1 |
| $Al_2O_3$ | 0.6 |

This frit was then prepared in a slip in accordance with the procedure set forth in Example 2. The slip was then applied to cleaned copper wire having a diameter of 0.032 inch by dip coating until a film of 0.7 mil was obtained in one pass, the wire being subjected to a temperature of 1475 degrees Fahrenheit for about 30 seconds in a nitrogen atmosphere. When this wire was tested in accordance with the procedure described in Example 2, the results were substantially the same as set forth in Example 14. These results made the wire entirely inappropriate for magnet wire purposes.

The broad useful range of the various ingredients, as determined as closely as possible by analytical surveys, is set forth concisely in the following table and in the remarks immediately following the table:

| Ingredients | Percent Maximum (by weight) | Percent Minimum (by weight) |
|---|---|---|
| $SiO_2$ | 40 | 8 |
| $PbO$ | 85 | 45 |
| $K_2O$ | 13 | 0 |
| $NiO$ | 11 | 2 |

$SiO_2$ can be replaced in an amount up to less than 15 parts by weight with $B_2O_3$.

Less than 20 parts by weight of PbO can be replaced by a molar equivalent amount of BaO.

Less than 20 parts by weight of PbO can be replaced by a molar equivalent amount of CaO.

Up to 20 parts by weight of PbO can be replaced by a molar equivalent amount of ZnO.

Up to 15 parts by weight of PbO can be replaced by a molar equivalent amount of SrO.

Less than 15 parts by weight of PbO can be replaced on a direct weight basis by $B_2O_3$.

All or part of the $K_2O$ can be replaced with $Na_2O$ on a direct weight basis.

All or part of the $K_2O$ can be replaced by $Li_2O$ on a molar equivalent basis.

Optimum results are obtained when the frit is just saturated with NiO; particularly where the proportions are as follows:

$K_2O$                        7
$PbO$                        63
$SiO_2$                        26
$NiO$                        4

However, useful combinations are obtained with both limited excesses and deficiencies of NiO. The minimum NiO content per 100 parts by weight of frit is the greater value between two parts by weight and one-third the amount required for saturation of the frit. The maximum NiO content is in the range between 110 and 150 percent by weight of the amount required for saturation of the frit, with the 150 percent figure being permissible when the NiO solubility is relatively low (in the range less than 5%); the figure decreases to 110 percent as the solubility of NiO rises above 5% to the vicinity of 10%, and in any event should not exceed 11 parts by weight per 100 parts by weight of the frit.

The foregoing describes the general outlines of the invention of the applicants insofar as the composition of the frit and of the insulating covering are concerned. Insofar as the exact constitution of the slip is concerned, the precise nature of the liquid carrier and of the electrolytes, and the manner of preparing the slip may be varied by those skilled in the art and are not deemed to constitute limiting factors in the invention. Also, while 1400 degrees Fahrenheit has been found to be substantially the lowest temperature at which the ceramic can be fused to the wire, the precise manner of applying the coating to the wire insofar as wire speed, temperature to which the wire is subjected, the amount of time at that temperature, and the atmosphere used are all variable factors well within the skill of those experienced in the art; their recitation in the specific examples is not to be understood to be limiting upon the invention. It should be added, however, that the experience of the applicants has shown that a highly oxidizing atmosphere in the oven is harmful to the coating on the wire and that while, as stated, the invention is not necessarily limited to the use of nitrogen, care must be taken that the atmosphere in the oven is not harmful to the coating which constitutes this invention. Thus, other atmospheres, such as helium, neon, krypton, etc., may be used.

In addition, it has been found that minor amounts of other materials in the frit can be tolerated without unduly adverse effects on the properties of the frit. The principal material which may be included without substantial adverse effect is $Al_2O_3$ (see examples), and it has been found experimentally that a maximum of three parts by weight of $Al_2O_3$ per 100 parts of $K_2O$, PbO, and $SiO_2$ can be tolerated. Thus, it is clear that small amounts of other materials may enter into the frit without avoiding the invention, and, in fact, it may well be that minor additions of various constituents will be found desirable in specific instances.

In view of the examples and ranges given above, and the discussion thereof, it will be apparent that while the invention has been explained by describing particular examples and specific ranges, improvements and modifications may be made without departing from the scope of the invention as defined in the appended claims.

What we claim as new and desire to secure by Letters Patent of the United States is:

1. A frit comprising per 100 parts by weight of frit (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight, and said $Li_2O$ being present in amounts from zero to 4 parts by weight, the amounts of said mixtures being from zero to the equivalent of 13 parts by weight of $K_2O$, $Na_2O$ and $K_2O$ being substituted for each other on a direct weight basis and $Li_2O$ being substituted on a molar equivalent basis; (2) a member selected from the group consisting of (a) 45 to 85 parts by weight PbO, (b) a mixture of PbO and the material selected from the group consisting of BaO, CaO, and mixtures thereof in which less than 20 parts by weight of the PbO in 2(a) above is replaced by a molar equivalent amount of said material (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixture of said members, (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) from a minimum of 2 parts by weight to a maximum of 11 parts by weight of NiO, the minimum NiO content per 100 parts by weight of frit being the greater value between 2 parts by weight and one-third of the amount of NiO required for saturation of the frit with NiO, the maximum NiO content ranging between 110 percent and 150 percent of the amount required for saturation of the frit with NiO but no more than 11 parts by weight per 100 parts by weight of frit.

2. A frit comprising per 100 parts by weight of frit (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight, and said $Li_2O$ being present in amounts from zero to 4 parts by weight, the amount of said mixture being from zero to the equivalent of 13 parts by weight of $K_2O$, $Na_2O$ and $K_2O$ being substituted for each other on a direct weight basis and $Li_2O$ being substituted on a molar equivalent basis, (2) a member selected from the group consisting of (a) 45 to 85 parts by weight of PbO, (b) a mixture of PbO and a material selected from the group consisting of BaO, CaO, and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) substantially that amount of nickel oxide required to saturate the frit.

3. A frit comprising per 100 parts by weight of frit (1) from zero to 13 parts by weight of $K_2O$, (2) 45 to 85 parts by weight of PbO, (3) 8 to 40 parts by weight of $SiO_2$ and (4) 2 to 11 parts by weight of NiO.

4. A frit comprising per 100 parts by weight of frit about 7 parts by weight of $K_2O$, about 4 parts by weight of NiO, about 63 parts by weight of PbO, and about 26 parts of $SiO_2$.

5. Copper wire, and a flexible vitreous electrically insulating coating adherent thereto comprising per 100 parts by weight (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight, and said $Li_2O$ being present in amounts from zero to 4 parts by weight, the amount of said mixture being from zero to the equivalent of 13 parts by weight of $K_2O$, $Na_2O$ and $K_2O$ being substituted for each other on a direct weight basis and $Li_2O$ being substituted on a molar equivalent basis; (2) a member selected from the group consisting of (a) 45 to 85 parts by weight PbO, (b) a mixture of PbO and a material selected from the group consisting of BaO, CaO, and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members, (3) a member selected from the group consisting of (a) 8 to 40 parts by weight of $SiO_2$ and (b) a mixture of $SiO_2$ and $B_2O_3$ in which less than 15 parts by weight of $SiO_2$ in 3(a) above is replaced by the same weight of $B_2O_3$ and (4) from a minimum of 2 parts by weight to a maximum of 11 parts by weight of NiO, the minimum NiO content per 100 parts by weight of frit being the greater value between 2 parts by weight and one-third of the amount of NiO required for saturation of the frit with NiO, the maximum NiO content ranging between 110 percent and 150 percent of the amount required for the saturation of the frit with NiO but no more than 11 parts by weight per 100 parts by weight of frit.

6. Copper wire, and a flexible vitreous electrically insulating coating adherent thereto comprising per 100 parts by weight (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight and said $Li_2O$ being present in amounts from zero to 4 parts by weight, the amount of said mixture being from zero to the equivalent of 13 parts by weight of $K_2O$, $Na_2O$ and $K_2O$ being substituted for each other on a direct weight basis and $Li_2O$ being substituted on a molar equivalent basis, (2) a member selected from the group consisting of (a) 45 to 85 parts by weight PbO, (b) a mixture of PbO and a material selected from the group consisting of BaO, CaO, and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members, (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$, and (4) substantially that amount of nickel oxide required to saturate the frit.

7. Copper wire, and a flexible vitreous electrically insulating coating adherent thereto comprising per 100 parts by weight (1) from zero to 13 parts by weight of $K_2O$, (2) 45 to 85 parts by weight of PbO, (3) 8 to 40 parts by weight of $SiO_2$ and (4) 2 to 11 parts by weight of NiO.

8. A frit comprising per 100 parts by weight of frit (1) from zero to 13 parts by weight of $K_2O$, (2) a member selected from the group consisting of (a) 45 to 85 parts by weight PbO, (b) a mixture of PbO and a material selected from the group consisting of BaO, CaO and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members, (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) from a minimum of 2 parts by weight to a maximum of 11 parts by weight of NiO, the minimum NiO content per 100 parts by weight of frit being the greater value between 2 parts by weight and one-third the amount of NiO required for saturation of the frit with NiO, the maximum NiO content ranging between 110 percent and 150 percent of the amount required for saturation of the frit with NiO but no more than 11 parts by weight per 100 parts by weight of frit.

9. A frit comprising per 100 parts by weight of frit (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight and said $Li_2O$ being present in amounts from zero to 4 parts by weight, the amount of said mixture being from zero to the equivalent of 13 parts by weight of $K_2O$, $Na_2O$ and $K_2O$ being substituted for each other on a direct weight basis and $Li_2O$ being substituted on a molar equivalent basis, (2) 45 to 85 parts by weight of PbO (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) from a minimum of 2 parts by weight to a maximum of 11 parts by weight of NiO, the minimum NiO content per 100 parts by weight of frit being the greater value between 2 parts by weight and one-third the amount of NiO required for saturation of the frit with NiO, the maximum NiO content ranging between 110 percent and 150 percent of the amount required for saturation of the frit with NiO but no more than 11 parts by weight per 100 parts by weight of frit.

10. A frit comprising per 100 parts by weight of frit (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight and said $Li_2O$ being present in amounts from zero to 4 parts by weight; the amount of said mixture being from zero to the equivalent of 13 parts by weight of $K_2O$, $Na_2O$ and $K_2O$ being substituted for each other on a direct weight basis and $Li_2O$ being substituted on a molar equivalent basis, (2) a member selected from group consisting of (a) 45 to 85 parts by weight PbO, (b) a mixture of PbO and a material selected from the group consisting of BaO, CaO, and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members (3) 8 to 40 parts by weight of $SiO_2$ and (4) from a minimum of 2 parts by weight to a maximum of 11 parts by weight of NiO, the minimum NiO content per 100 parts by weight of frit being the greater value between 2 parts by weight and one-third the amount of NiO required for saturation with NiO, the maximum NiO content ranging between 110 percent and 150 percent of the amount required for saturation with NiO but no more than 11 parts by weight per 100 parts by weight of frit.

11. A process for coating magnet wire comprising the steps of passing the wire through a slip comprising, first, a frit which includes (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight, and said $Li_2O$ being present in amounts from zero to 4 parts by weight, the amount of said mixtures being from zero to the equivalent of 13 parts by weight of $K_2O$, $Na_2O$ and $K_2O$ being substituted for each other on a direct weight basis and $Li_2O$ being substituted on a molar equivalent basis; (2) a member selected from the group consisting of (a) 45 to 85 parts by weight PbO, (b) a mixture of PbO and a material selected from the group consisting of BaO, CaO, and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) from a minimum of 2 parts by weight to a maximum of 11 parts by weight of NiO the minimum NiO content being the greater value between 2 parts by weight and one-third of the amount of NiO required for saturation of the frit with NiO, the maximum NiO content ranging between 110 percent and 150 percent of the amount required for saturation of the frit with NiO but no more than 11 parts by weight per 100 parts by weight of frit; second, suspending electrolytes; and third, a liquid carrier; then heating the coated wire at a temperature above 1400 degrees Fahrenheit in an inert atmosphere.

12. A process for coating magnet wire comprising the steps of passing the wire through a slip comprising, first, a frit which includes (1) from zero to 13 parts by weight of $K_2O$, (2) 45 to 85 parts by weight of PbO (3) 8 to 40 parts by weight of $SiO_2$ and (4) 2 to 11 parts by weight of NiO; second, suspending electrolytes; and third, a liquid carrier; then heating the coated wire at a temperature above 1400 degrees Fahrenheit in a nitrogen atmosphere.

13. Copper wire, and a flexible vitreous electrically insulating coating adherent thereto comprising per 100 parts by weight (1) from zero to 13 parts by weight of $K_2O$, (2) a member selected from the group consisting of (a) 45 to 85 parts by weight PbO, (b) a mixture of PbO and a material selected from the group consisting of BaO, CaO and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) from a minimum of 2 parts by weight to a maximum of 11 parts by weight of NiO, the minimum NiO content per 100 parts by weight of frit being the greater value between 2 parts by weight and one-third the amount of NiO required for saturation of the frit with NiO, the maximum NiO content ranging between 110 percent and 150 percent of the amount required for saturation of the frit with NiO but no more than 11 parts by weight per 100 parts by weight of frit.

14. Copper wire, and a flexible vitreous electrically insulating coating adherent thereto comprising per 100 parts by weight (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight and said $Li_2O$ being present in amounts from zero to 4 parts by weight, the amount of said mixture being from zero to the equivalent of 13 parts by weight of $K_2O$, $Na_2O$ and $K_2O$ being substituted for each other on a direct weight basis and $Li_2O$ being substituted on a molar equivalent basis, (2) 45 to 85 parts by weight of PbO (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) from a minimum of 2 parts by weight to a maximum of 11 parts by weight of NiO, the minimum NiO content per 100 parts by weight of frit being the greater value between 2 parts by weight and one-third the amount of NiO required for saturation of the frit with NiO, the maximum NiO content ranging between 110 percent and 150 percent of the amount required for saturation of the frit with NiO but no more than 11 parts by weight per 100 parts by weight of frit.

15. Copper wire, and a flexible vitreous electrically insulating coating adherent thereto comprising per 100 parts by weight (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight and said $Li_2O$ being present in amounts from zero to 4 parts by weight, the amount of said mixture being from zero to the equivalent of 13 parts by weight of $K_2O$, $Na_2O$ and $K_2O$ being substituted for each other on a direct weight basis and $Li_2O$ being substituted on a molar equivalent basis, (2) a member selected from group consisting of (a) 45 to 85 parts by weight PbO, (b) a mixture of PbO and a material selected from the group consisting of BaO, CaO, and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members (3) 8 to 40 parts by weight of $SiO_2$ and (4) from a minimum of 2 parts by weight to a maximum of 11 parts by weight of NiO, the minimum NiO content per 100 parts by weight of frit being the greater value between 2 parts by weight and one-third the amount of NiO required for saturation with NiO, the maximum NiO content ranging between 110 percent and 150 percent of the amount required for saturation with NiO but no more than 11 parts by weight per 100 parts by weight of frit.

16. A process for coating magnet wire comprising the steps of passing the wire through a slip comprising, first, a frit which includes (1) a member selected from the group consisting of $K_2O$, $Na_2O$ and $Li_2O$ and mixtures thereof, said $K_2O$ being present in amounts from zero to 13 parts by weight, said $Na_2O$ being present in amounts from zero to 13 parts by weight, and said $Li_2O$ being present in amounts from zero to 4 parts by weight, the amount of said mixture being from zero to the equivalent of 13 parts by weight of $K_2O$, $Na_2O$ and $K_2O$ being substituted for each other on a direct weight basis and $Li_2O$ being substituted on a molar equivalent basis, (2) a member selected from the group consisting of (a) 45 to 85 parts by weight of PbO, (b) a mixture of PbO and a material selected from the group consisting of BaO, CaO, and mixtures thereof in which less than 20 parts by weight of the PbO in 2(a) above is replaced by a molar equivalent amount of said material, (c) a mixture of PbO and ZnO in which up to 20 parts by weight of the PbO in 2(a) above is replaced by a molar equivalent amount of ZnO, (d) a mixture of PbO and SrO in which up to 15 parts by weight of the PbO in 2(a) above is replaced by a molar equivalent amount of SrO and (e) a mixture of PbO and $B_2O_3$ in which less than 15 parts by weight of the PbO in 2(a) above is replaced by the same weight of $B_2O_3$, and mixtures of said members (3) a member selected from the group consisting of (a) 8 to 40 parts by weight of $SiO_2$ and (b) a mixture of $SiO_2$ and $B_2O_3$ in which less than 15 parts by weight of the $SiO_2$ in 3(a) above is replaced by the same weight of $B_2O_3$ and (4) substantially that amount of nickel oxide required to saturate the frit; second, suspending electrolytes; and third, a liquid carrier; then heating the coated wire at a temperature above 1400 degrees Fahrenheit in an inert atmosphere.

References Cited in the file of this patent

UNITED STATES PATENTS

| | | |
|---|---|---|
| 2,023,998 | Fustier | Dec. 10, 1935 |
| 2,071,533 | Ihrig | Feb. 23, 1937 |
| 2,397,005 | Harbert et al. | Mar. 19, 1946 |
| 2,421,652 | Robinson et al. | June 3, 1947 |

FOREIGN PATENTS

| | | |
|---|---|---|
| 204,888 | Australia | Dec. 1, 1955 |

OTHER REFERENCES

Howe et al.: Journal of the American Ceramic Society, vol. 20, 1937, pp. 319–325.